(12) United States Patent
Cavender-Bares et al.

(10) Patent No.: US 10,377,170 B2
(45) Date of Patent: Aug. 13, 2019

(54) ROBOTIC PLATFORM AND METHOD FOR OPERATING PERPENDICULAR TO CROP ROWS ON AGRICULTURAL FIELDS

(71) Applicant: RowBot Systems LLC, Minneapolis, MN (US)

(72) Inventors: Kent Cavender-Bares, St. Paul, MN (US); Matthew Camacho-Cook, Bethesda, MD (US)

(73) Assignee: RowBot Systems LLC, Minneapolis, MN (US)

( * ) Notice: Subject to any disclaimer, the term of this patent is extended or adjusted under 35 U.S.C. 154(b) by 6 days.

(21) Appl. No.: 15/180,685

(22) Filed: Jun. 13, 2016

(65) Prior Publication Data

US 2016/0361949 A1     Dec. 15, 2016

Related U.S. Application Data

(60) Provisional application No. 62/174,998, filed on Jun. 12, 2015.

(51) Int. Cl.

| | |
|---|---|
| *A01B 39/12* | (2006.01) |
| *B60B 19/00* | (2006.01) |
| *A01B 21/04* | (2006.01) |
| *A01B 21/08* | (2006.01) |
| *A01B 39/18* | (2006.01) |

(52) U.S. Cl.
CPC .............. *B60B 19/00* (2013.01); *A01B 21/04* (2013.01); *A01B 21/086* (2013.01); *A01B 39/12* (2013.01); *A01B 39/18* (2013.01)

(58) Field of Classification Search
CPC ......... A01B 39/12; A01B 39/14; A01B 39/18; A01B 39/26; A01B 76/00; B60B 19/00; B60B 15/18; B62D 57/02; B62D 57/022
USPC ............ 305/1, 4; 180/8.7; 280/5.26; 172/90, 172/333, 534
See application file for complete search history.

(56) References Cited

U.S. PATENT DOCUMENTS

| | | | | |
|---|---|---|---|---|
| 1,369,604 | A | * | 2/1921 | Bazemore .............. A01B 29/04 172/534 |
| 1,413,760 | A | * | 4/1922 | Moreland .............. A01B 41/04 172/157 |
| 1,601,667 | A | * | 9/1926 | Bazemore .............. A01B 41/04 15/38 |

(Continued)

FOREIGN PATENT DOCUMENTS

CA            2203940 A1 * 10/1998 ............. B60B 15/02

*Primary Examiner* — Matthew Troutman
(74) *Attorney, Agent, or Firm* — Patterson Thuente Pedersen, P.A.

(57) ABSTRACT

A multi-lobed wheel adapted to be mounted to an agricultural platform for traversal of an agricultural field generally traverse to adjacent rows of planted crops without crushing the individual plants. The multi-lobed wheel having a wheel hub including a central axis on which the multi-lobed wheel is configured to rotate and a plurality of spaced apart lobes defining an outer perimeter configured to make ground engaging contact with the agricultural field, the outer perimeter including structure presenting a plurality of gaps between the plurality of spaced apart lobes, the gaps shaped and sized to provide sufficient clearance for individual plants within a planted crop row so as to enable the multi-lobed wheel to pass over a planted crop row without crushing the individual plants therein.

10 Claims, 14 Drawing Sheets

(56) References Cited

U.S. PATENT DOCUMENTS

| | | | | |
|---|---|---|---|---|
| 2,456,901 A * | 12/1948 | Swafford | ............... | A01B 41/00 |
| | | | | 126/271.2 C |
| 7,775,167 B2 * | 8/2010 | Stehling | ................ | A01C 7/208 |
| | | | | 111/69 |
| 8,260,459 B2 * | 9/2012 | Herbert | ................ | B62D 57/02 |
| | | | | 700/245 |
| 8,905,490 B2 * | 12/2014 | Norman | ................ | B60B 11/02 |
| | | | | 180/218 |
| 9,265,187 B2 | 2/2016 | Cavender-Bares et al. | | |
| 9,288,938 B2 | 3/2016 | Cavender-Bares et al. | | |
| 2010/0076598 A1 * | 3/2010 | Herbert | ................ | B62D 57/02 |
| | | | | 700/245 |
| 2015/0051779 A1 | 2/2015 | Camacho-Cook et al. | | |
| 2015/0230390 A1 * | 8/2015 | Green | .................... | A01B 63/24 |
| | | | | 172/1 |
| 2016/0124433 A1 | 5/2016 | Cavender-Bares et al. | | |
| 2016/0157415 A1 | 6/2016 | Cavender-Bares et al. | | |
| 2018/0139947 A1 * | 5/2018 | Albert | .................... | A01M 7/00 |
| 2018/0153084 A1 * | 6/2018 | Calleija | ................ | A01M 21/02 |

\* cited by examiner

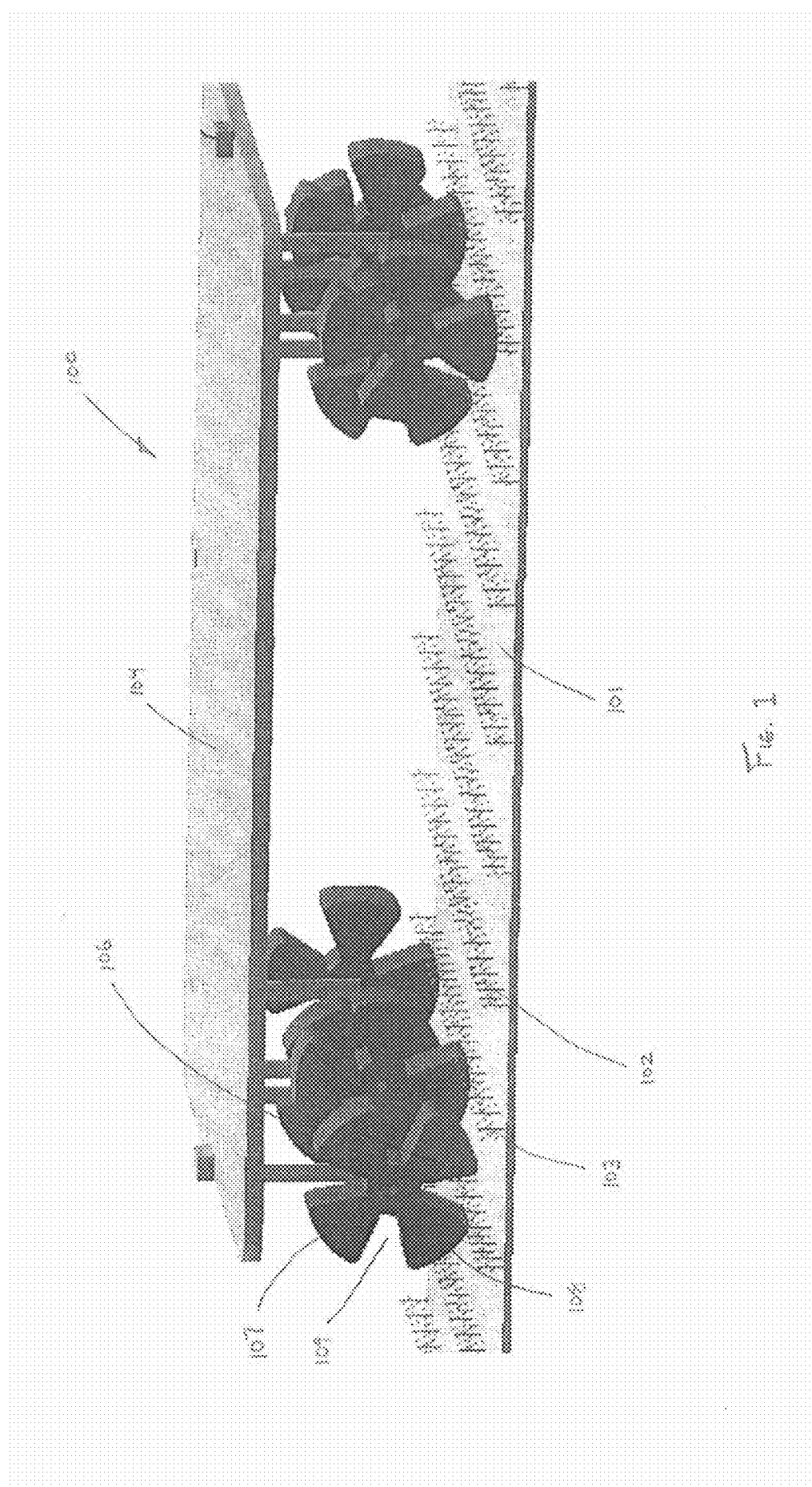

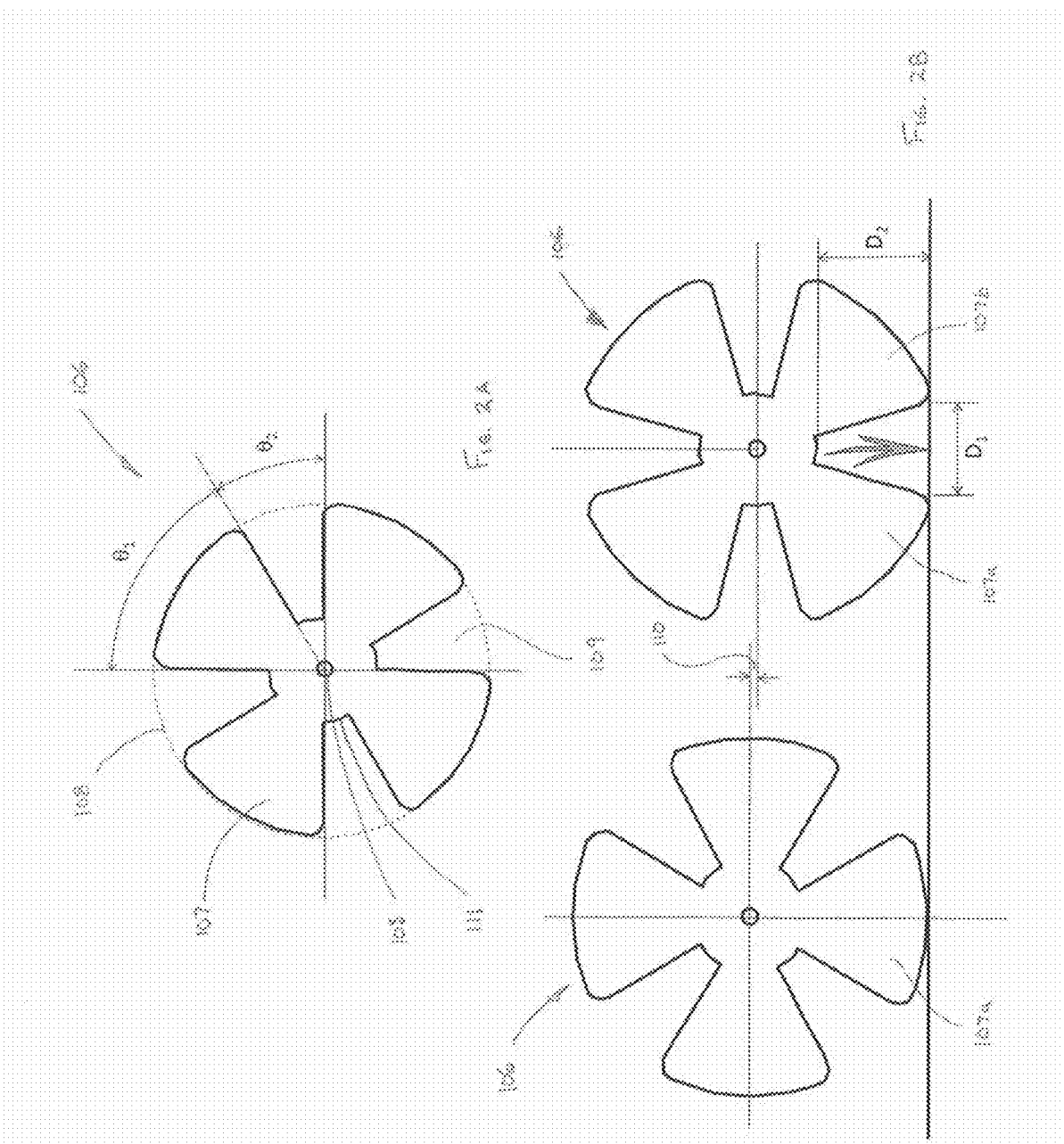

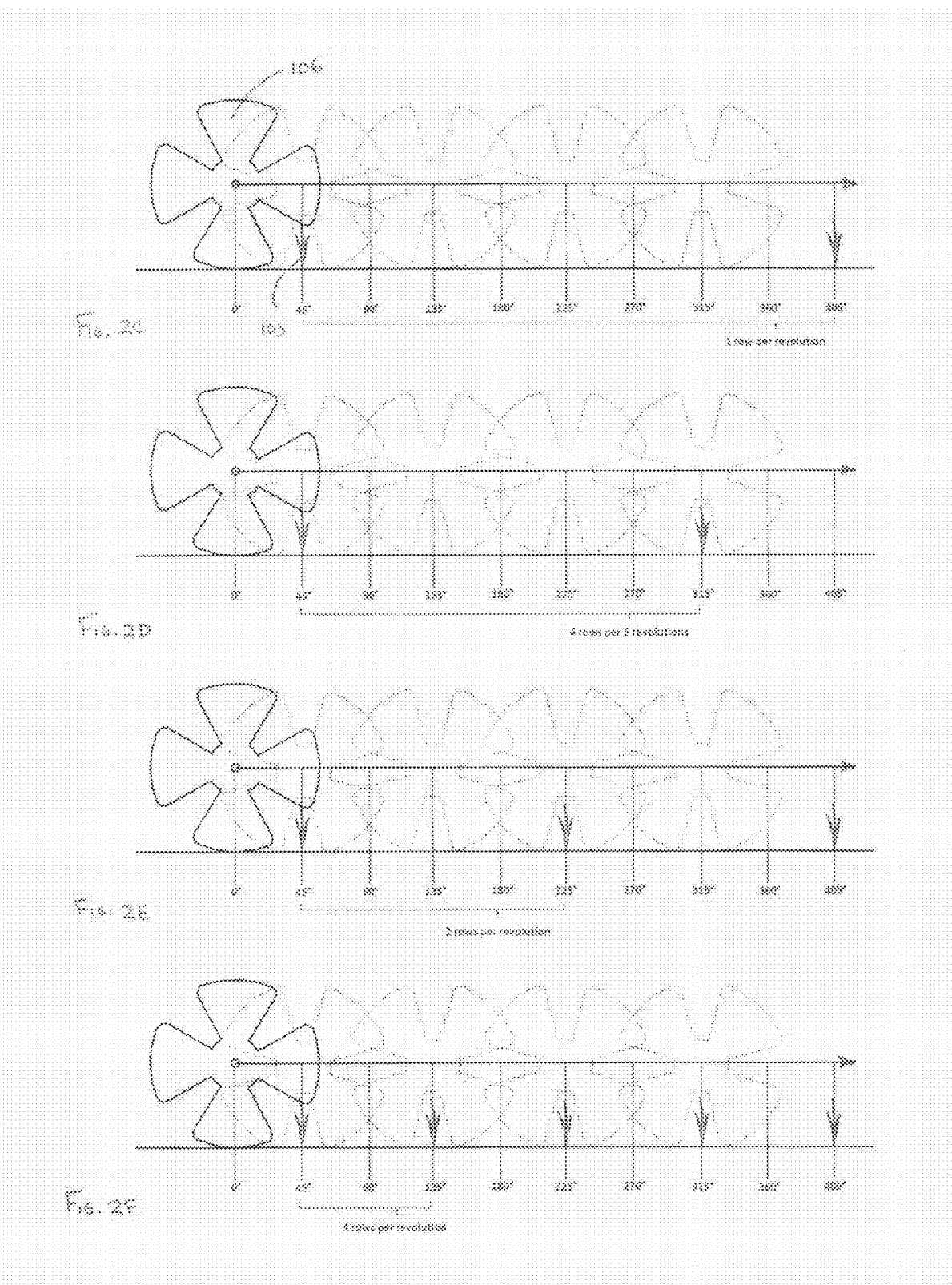

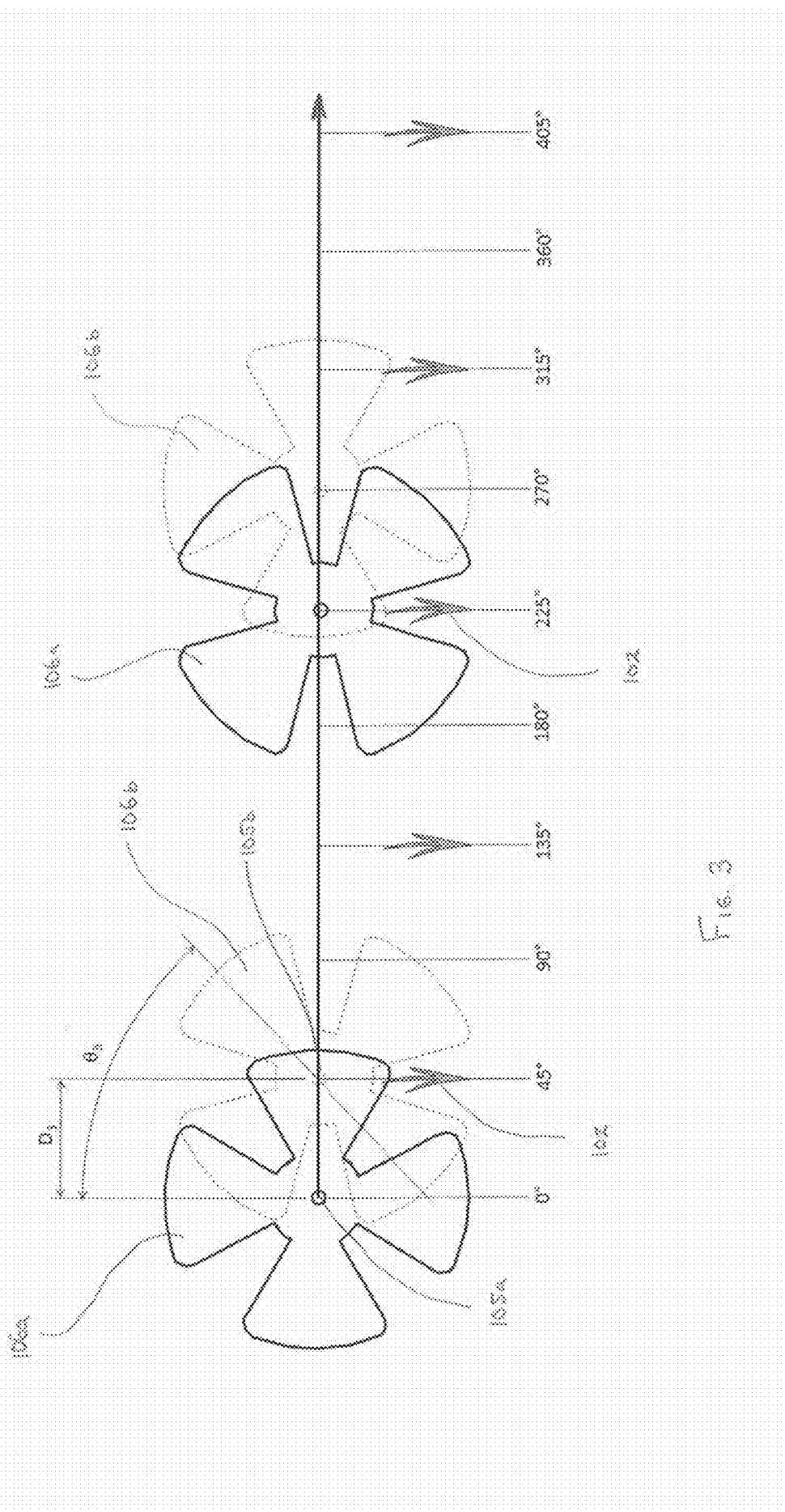

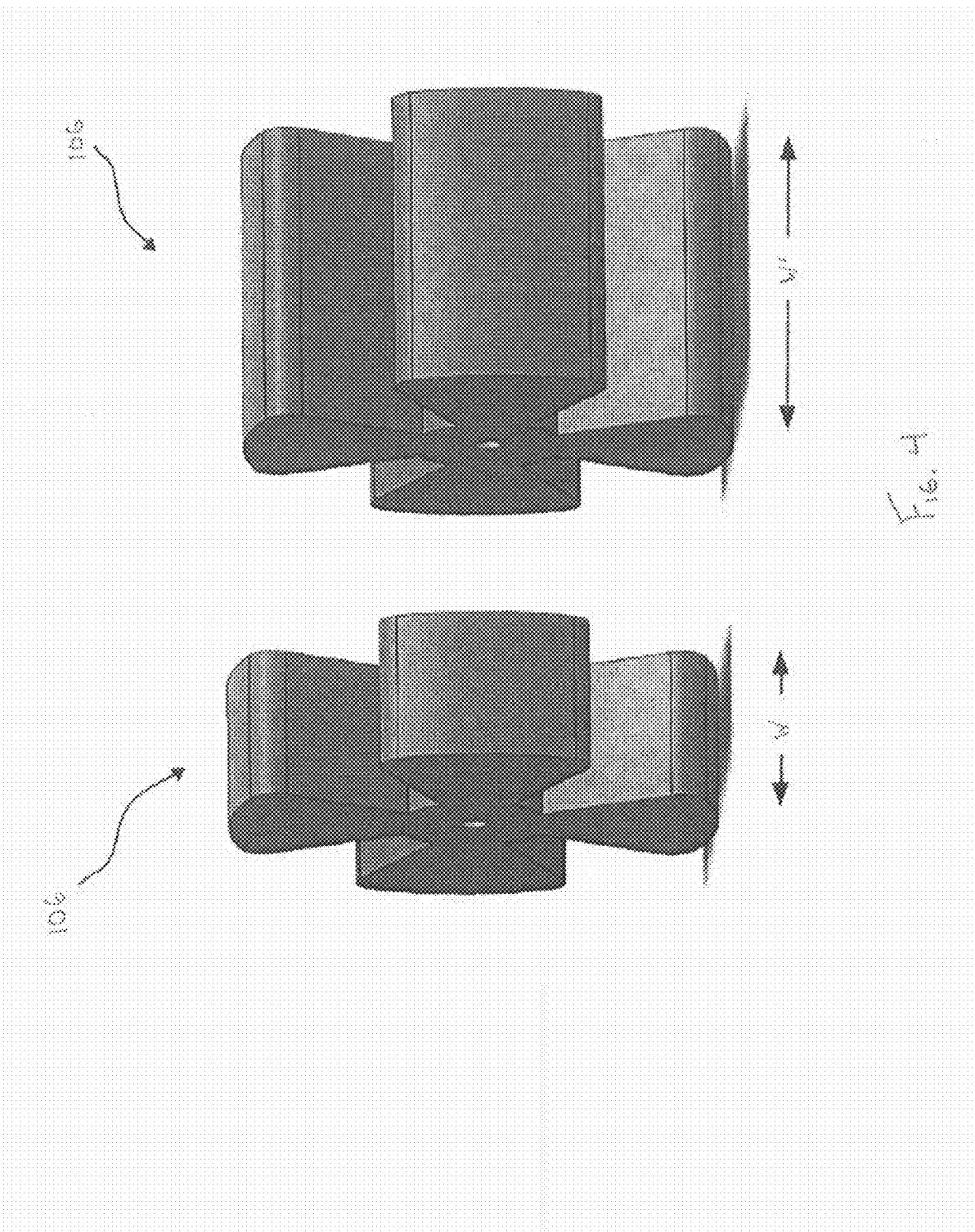

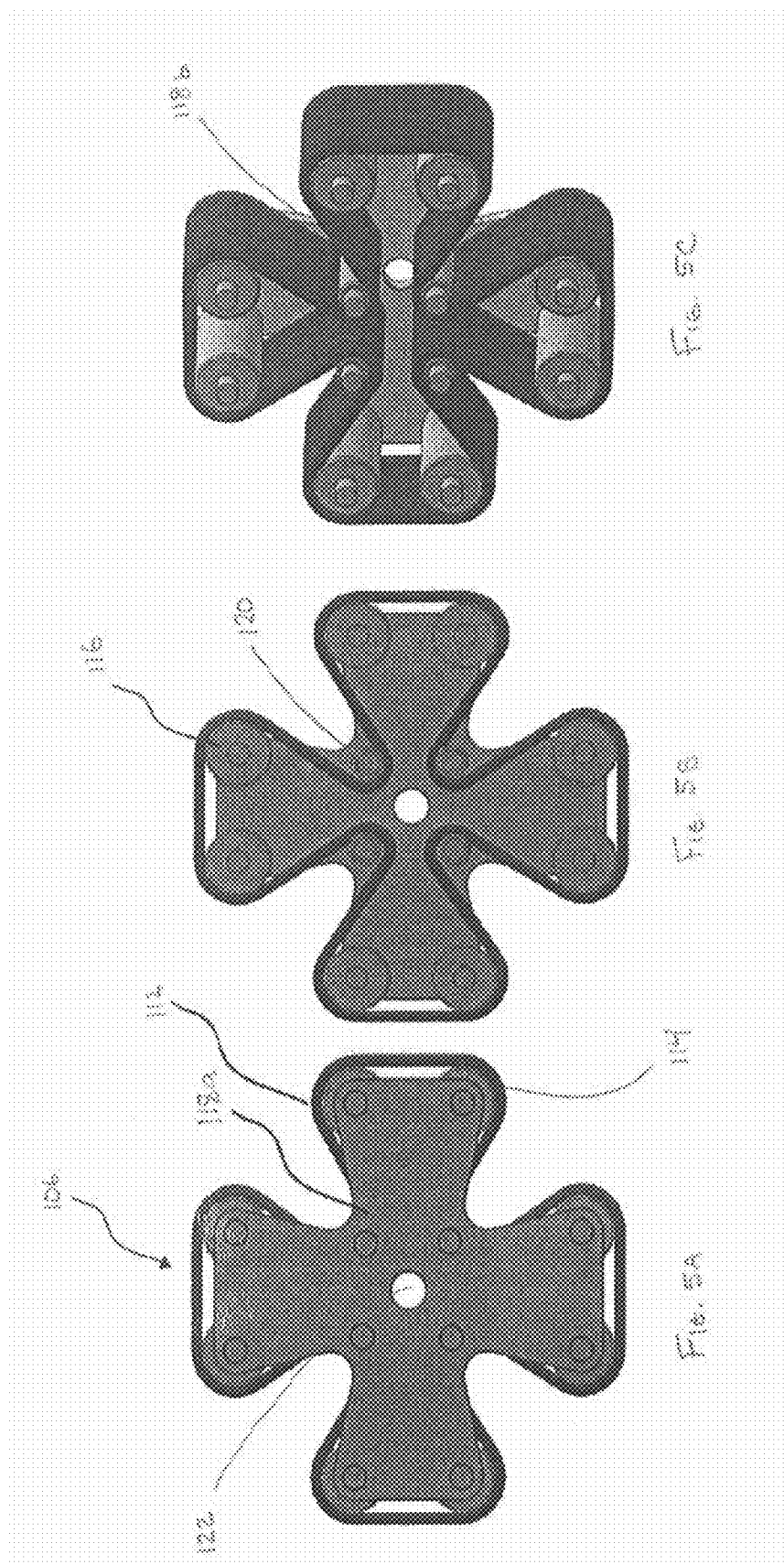

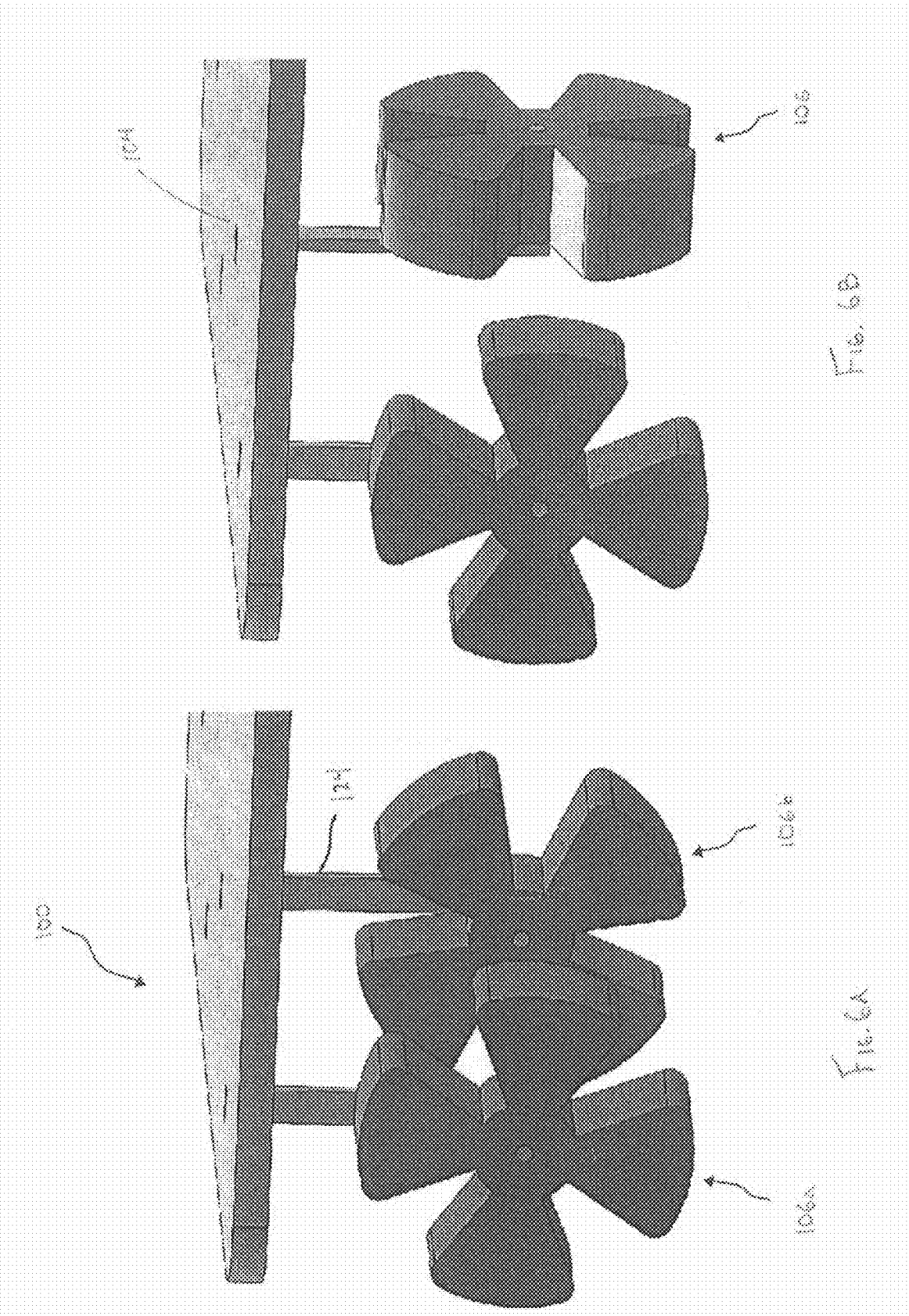

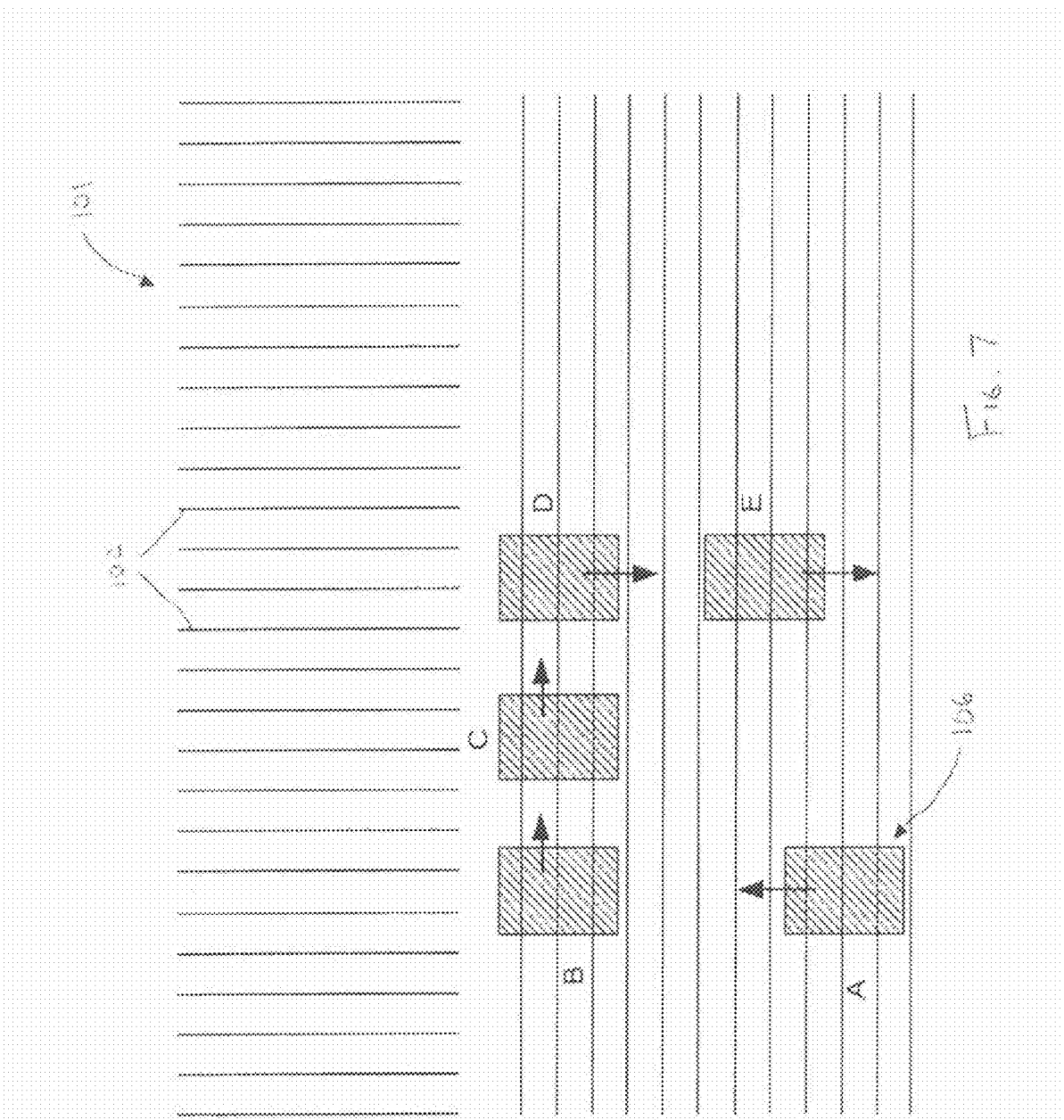

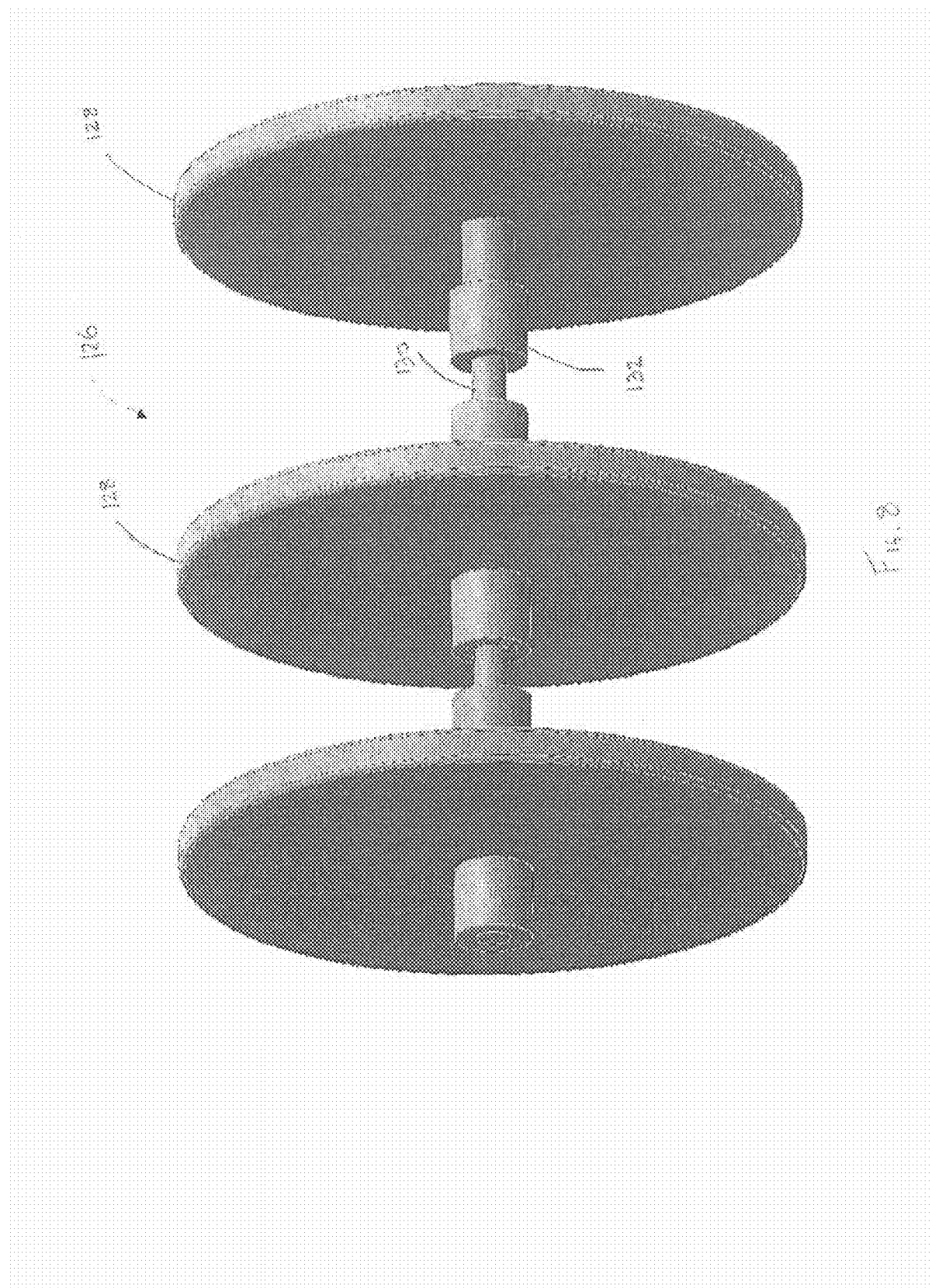

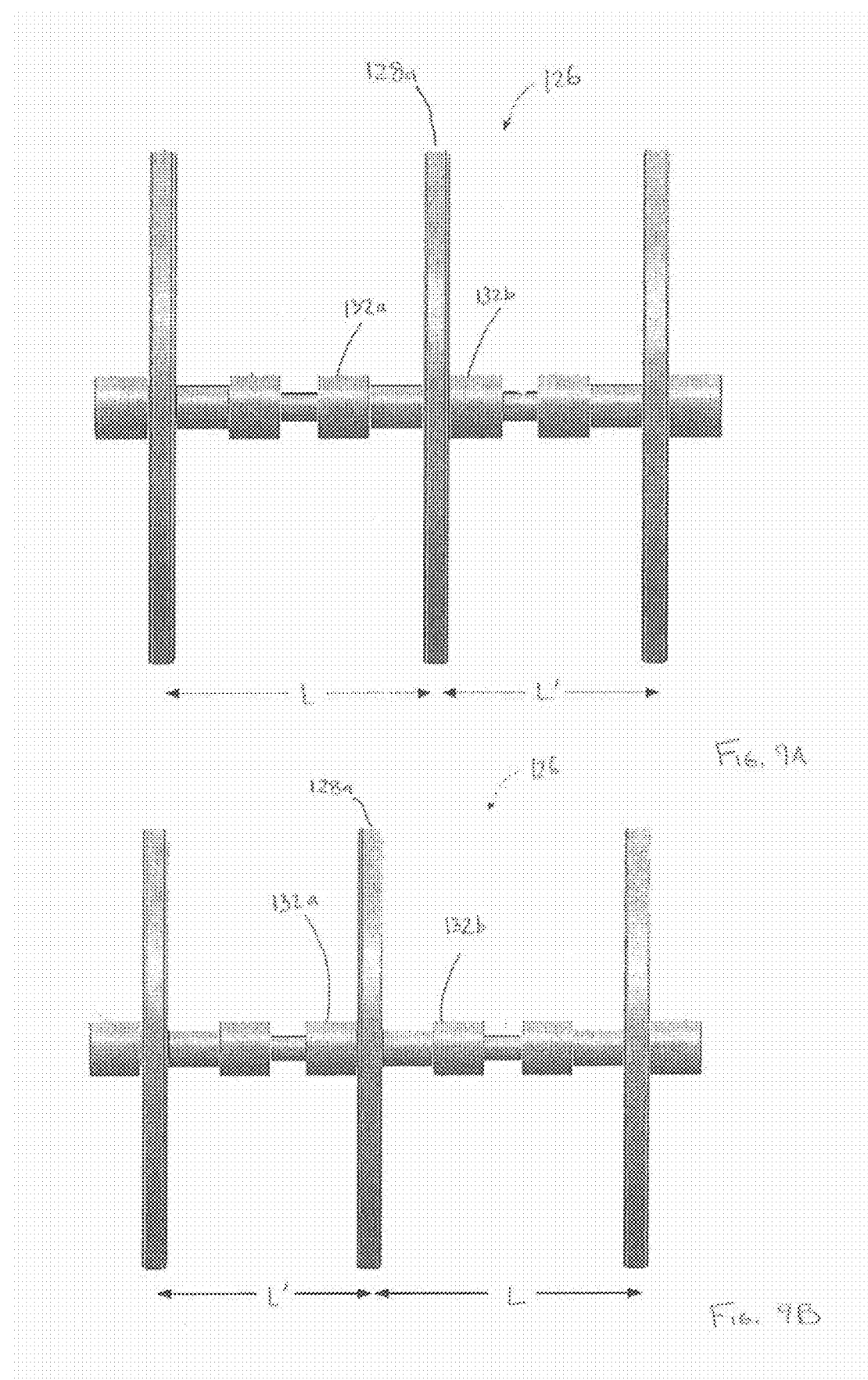

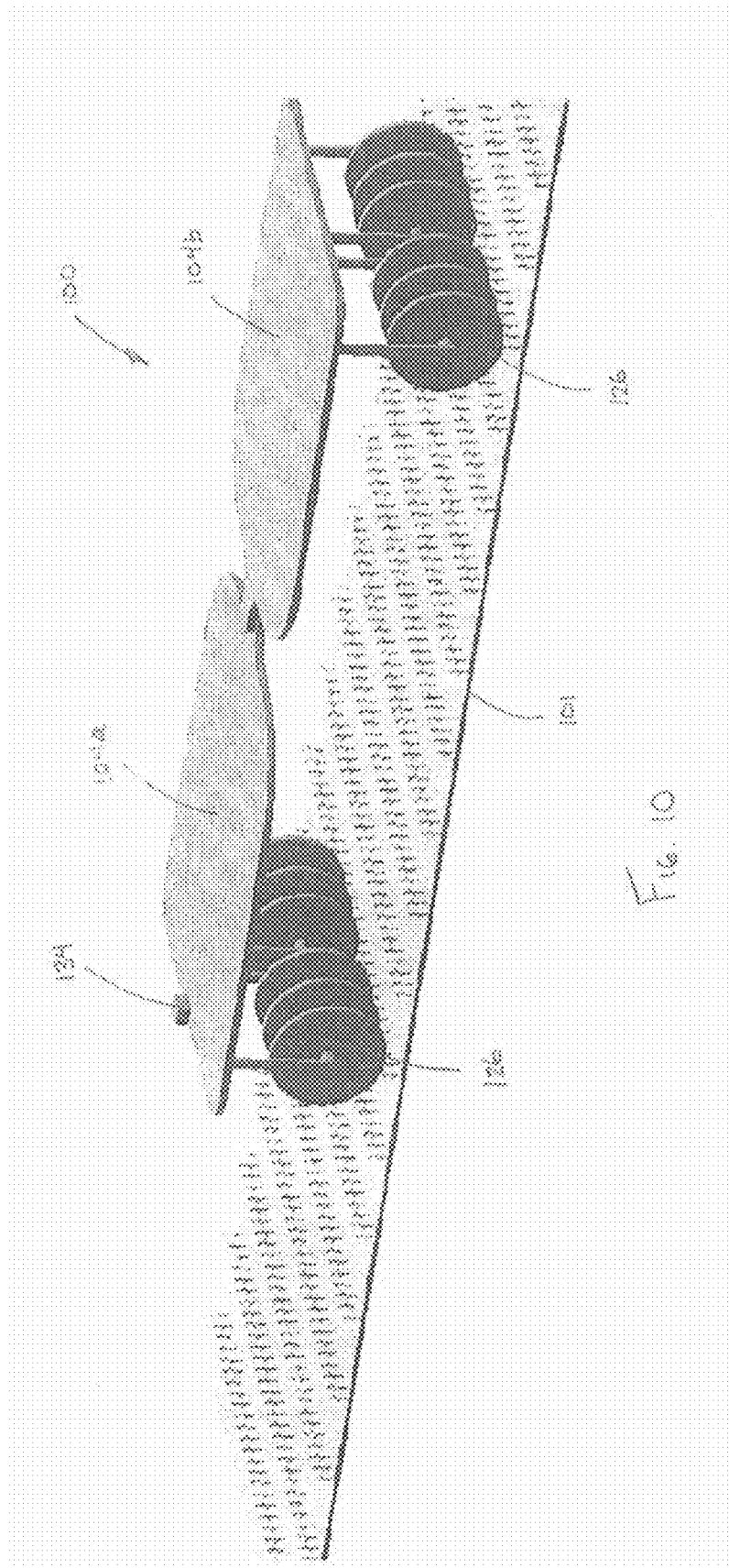

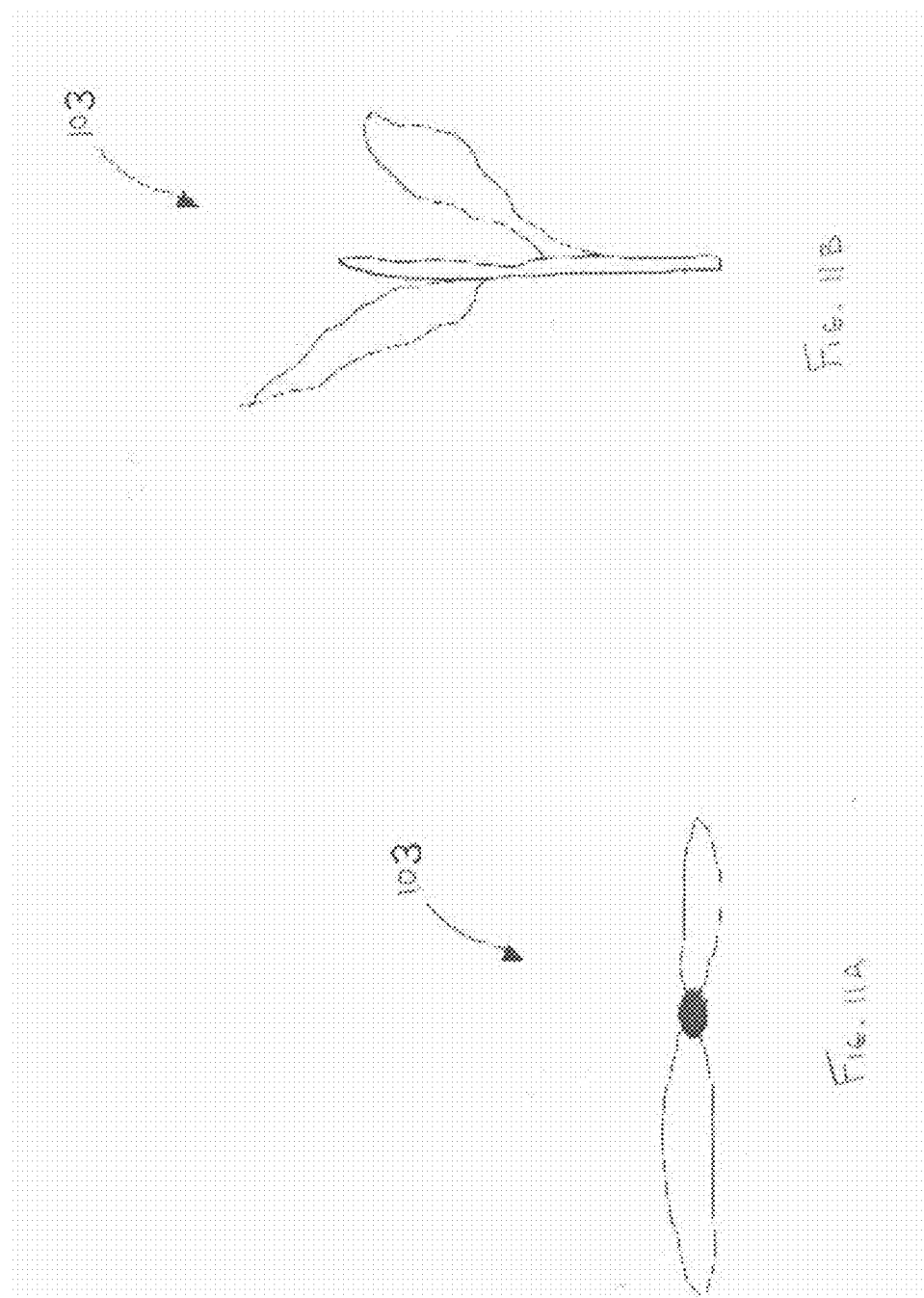

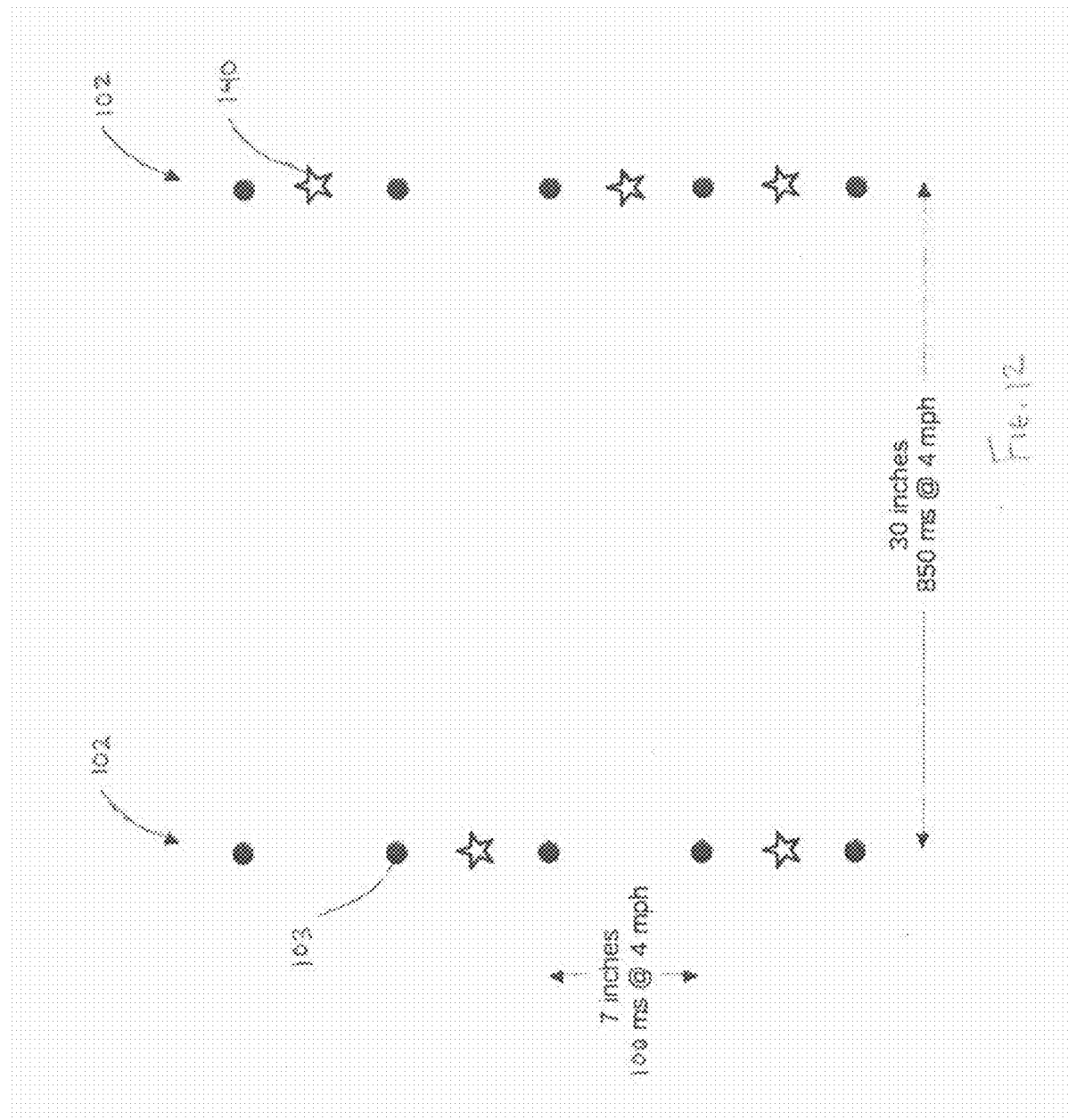

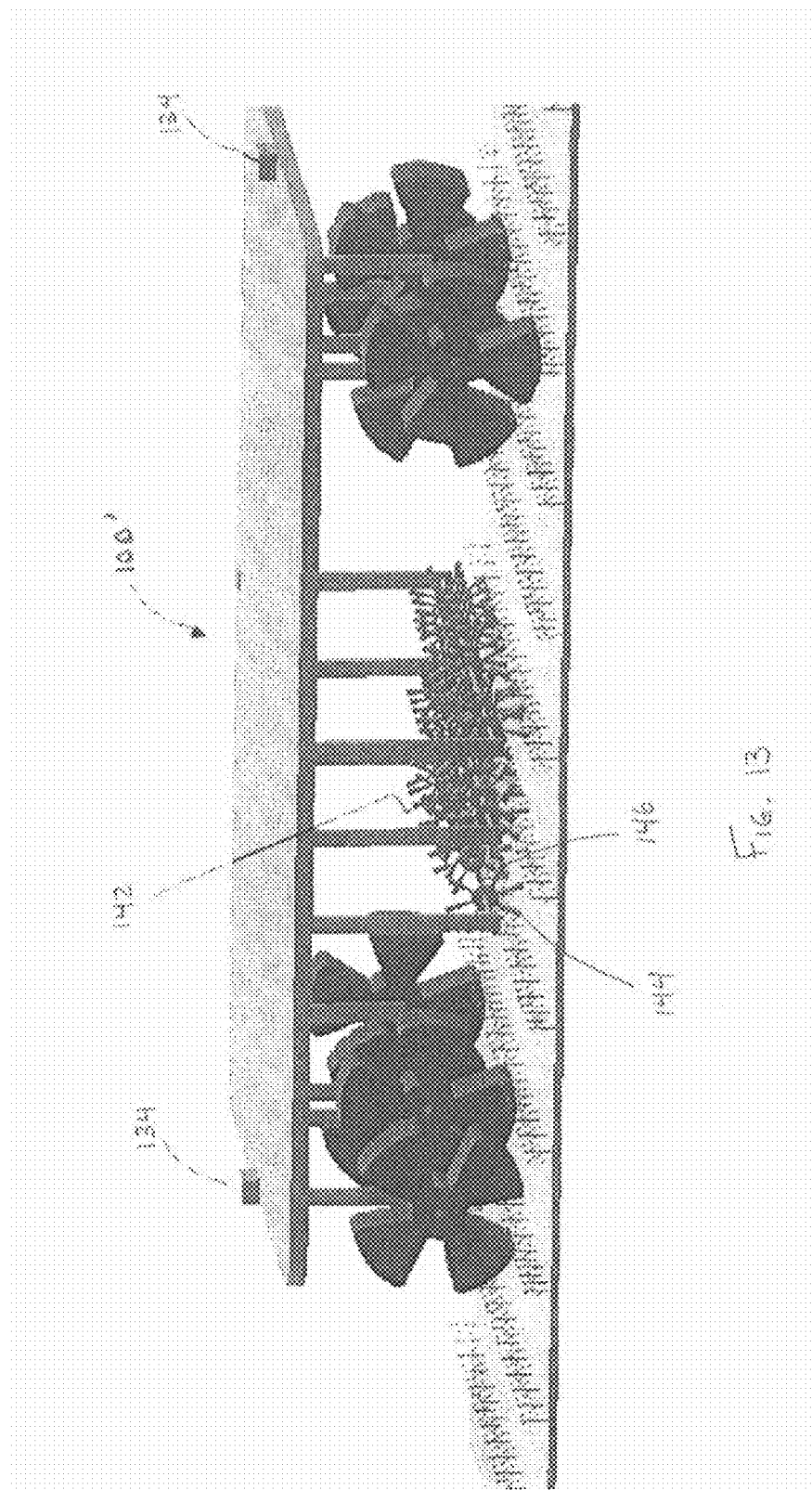

ROBOTIC PLATFORM AND METHOD FOR OPERATING PERPENDICULAR TO CROP ROWS ON AGRICULTURAL FIELDS

RELATED APPLICATION INFORMATION

This application claims the benefit of U.S. Provisional Application 62/174,998, filed Jun. 12, 2015, which is hereby incorporated by reference.

TECHNICAL FIELD

The present disclosure relates generally to platforms for use in agriculture. More particularly, the present disclosure relates to platforms having wheels adapted to traverse an agriculture field perpendicular to planted crop rows without damaging the individual crop plants.

BACKGROUND

Controlling weed growth in agricultural fields is an important part of crop production. Weeds compete with crop plants and have the potential to reduce crop yields. Conventionally, farmers use herbicides as one of the primary tools for controlling weeds. In the past, herbicides have worked well in eliminating the tedious job of repeatedly removing weeds through mechanical cultivation. There is, however, a growing concern today that some weeds are developing a resistance to herbicides. These herbicide resistant weeds have created a major management challenge for conventional growers who are increasingly required to resort to new chemicals, mixtures of several chemical herbicides, or mechanical cultivation methods to control such weeds. Moreover, growers who wish to market their crops in the organic food markets ("organic farmers") are restricted from using conventional herbicides and generally must rely on mechanical cultivation methods.

Presently, several types of mechanical cultivators are available for managing weeds in cases where chemical herbicides are not used including: rotary hoes, tine cultivators, burners fueled by liquid petroleum, and cultivators that use a broad shoe dragged through the soil to cover smaller weeds with dirt and restrict their growth (often referred to as Buffalo cultivators). Each of these cultivation tools is commonly used at a particular stage of the crop (e.g., crop height). After the crop stage has passed, or if the weeds are taller than expected, the effectiveness of any particular cultivation tool is significantly decreased. For example, when excessive rain delays weeding cultivation, the weeds can grow to a size where the cultivation tool that matches the stage of the crop growth can no longer effectively remove the weeds.

Typical agricultural row crop fields, such as those planted with corn or soybeans, are planted with a repeated pattern of rows, each row containing a plurality of individual plants spaced in close proximity to one another, so as to be planted at relatively high density along the row, on average from five to seven inches apart for corn. Row spacing can vary from farm-to-farm, but row spacing is often less than thirty-six inches wide (i.e., crops planted on thirty-six inch centers); for example, rows of corn are often spaced twenty or thirty inches apart.

In general, weeds found in the gaps between rows (between-row weeds) can be managed by making multiple passes over the field with conventional mechanical cultivators, provided that the farmer is able to operate the equipment at the appropriate time in order to prevent weed growth from progressing to the stage where it cannot be managed with available equipment.

Weeds that grow between crop plants within a row (in-row weeds) are difficult to manage effectively. Early in the growing season, an implement such as a rotary hoe can be used to disrupt both between-row and in-row weeds without apparent damage to the crop plants. If the weeds between crop plants end up being considerably shorter than the crop plants when the crop plants are sturdy and approximately 10 inches or taller, then an implement such as a Buffalo cultivator (Bison Industries, Inc.) can be used to pile dirt up in a ridge centered on the crop plant stems, which generally results in the in-row weeds being buried. Similarly, propane flamers (e.g., Flame Engineering, Inc.) can be used to slow or stop weed growth, both between rows and in the area next to crop plants, apparently without significant damage to the crop plants themselves. Finger weeding tools (e.g., Buddingh Weeder Co.) can be used to push soil in between crop plants in order to disrupt weed growth in this area, although good alignment of the tools on the crop row is critical; alignment may be improved with machine-vision solutions to adjust the implement's track side-to-side such that it stays centered on the row (e.g., Einboeck).

There are emerging technologies for weed management that use machine vision to target specific actions. Technologies have been demonstrated whereby a chemical, including concentrated fertilizer or herbicide, is sprayed in a targeted fashion on weeds (Blue River Technology, SwarmFarm); such technologies are applicable to both between-row and in-row weeds. These technologies require reliable weed detection using machine vision and accurate actuation and targeting of the spray. Technical constraints will dictate a minimum cycle time necessary for the full process of weed detection and deployment of the targeted spray. These technical constraints will dictate the forward ground speeds that are possible for effective weed removal. The ground speed of the device will be a key cost driver of such a technology on a per area basis.

While speed of action is required for these smart spraying technologies, actuation is limited to a solenoid valve or the like controlling a spray nozzle. A device that uses a mechanical action of a tool to physically disrupt or remove in-row weeds introduces additional constraints. Like the technologies that detect a weed and spray, these mechanical systems require a minimum cycle time for detection of the weed and removal or disruption by the mechanical device. Importantly, these systems are required to work around and not damage the crop plants. In addition, these mechanical systems have to make good soil contact over what might be rough terrain.

In one example of a mechanical technology, a robotic machine locates weeds with machine vision and then uses a blunt tool to push weeds into the ground (Bosch's Deep Field Robotics). Other technologies have been developed to reach in between crop plants in the crop row while the implement moves parallel to the crop rows (e.g., Robocrop InRow Weeder by Garford Farm Machinery). The required mechanical action must be very rapid and well-guided based on machine vision in order for the overall implement to be able to maintain an economically-relevant forward motion. As crop plant spacing is reduced, in general, the forward speed of such a machine would also need to be reduced. Thus, for a relatively closely-spaced crop like corn, the forward speed may prove too slow to be economical.

According to conventional practices, tractors and implements drawn by the tractors are commonly operated such that their wheels travel within the unplanted space or gap between rows. In this way, the wheels move parallel to the rows as the tractor and implement traverses the field, thereby limiting crop damage. In infrequent cases, farmers operate their equipment perpendicular to rows, for example to apply herbicide. This practice, however, is infrequent as it may cause damage to the crop as the wheels or tires of the equipment drive over the individual plants.

In-row weeds are difficult to remove using conventional equipment, especially on the fields of organic farmers who have restrictions related to chemical use. In-row weed removal is challenging given that current machinery travels within the row, requiring quick action of mechanical weed removal tools in order for technologies to be economical. Further, in-row travel limits the perspective a machine vision system has on the crop rows. In contrast, a machine vision system that moved perpendicular to the row might be helpful to distinguish crop plants from in-row weeds because it would provide a view of crop rows from a generally traverse angle to the row rather than from above the row while moving parallel to the rows. Similarly, a weeding tool that moves generally traverse to the row would have a longer cycle time for sensing weeds and carrying out a mechanical action to disrupt or remove the in-row weeds. In addition, a mechanical weed removal tool might be required to travel a shorter distance to achieve the removal of in-row weeds.

Recently there has been an interest in the use of robotic vehicles that can navigate between planted crop rows on the uneven terrain in the gap between parallel rows of an agricultural field to accomplish in-season management tasks, such as selectively applying fertilizer, herbicides or other agricultural chemicals when the use of conventional tractor-drawn equipment or high clearance machines is no longer feasible. An example agricultural robotic vehicle of this type is disclosed in U.S. Pat. Nos. 9,288,938; 9,265,187, and U.S. Patent Publ. No. 2015/0051779, all of which are incorporated by reference herein. While such a robotic platform provides new ways to perform field work when conventional machines are challenged, they are still designed to travel parallel to the crop rows.

Thus, despite the various weed control measures available, weed cultivation continues to be a problem. In particular, early in the season it has proven difficult to remove weeds that are found within the crop rows between the individual plants. Accordingly, what is needed in the industry is a highly-reliable, cost-effective mechanical weeding system that can effectively remove in-row weeds, as well as between-row weeds. In particular, what is needed is a mechanical weeding platform configured to traverse a field and cultivate weeds generally traverse to the rows of individual plants without causing damage to the crops.

SUMMARY OF THE DISCLOSURE

Embodiments of the present disclosure meet the need of the industry for a platform configured to traverse an agricultural field generally traverse to the planted crop rows, instead of parallel to the crop rows. Such a platform would be ideal to remove in-row weeds between individual crop plants within a planted crop row and would also be suitable for removing between-row weeds. In particular, traveling generally traverse to the planted crop rows, as opposed to traveling parallel to the rows, enables a machine-vision based technology on the platform to determine more accurately the location of the individual plants and increases the cycle time for sensing and removing weeds using mechanical weed removal tools.

In one embodiment, the platform includes a plurality of lobed wheels configured to traverse an agricultural field generally traverse to rows of individual plants without damaging the individual plants. In one embodiment, the platform further includes a cultivation mechanism for mechanical weed removal. In this embodiment, while traversing generally traverse to planted crop rows, the platform identifies and determines the location of individual plants relative to the platform, and mechanically removes any in-row weeds in the gap between the identified crop plants, as well as some or all of the weeds located between rows.

Traveling generally traverse to the planted crop rows enables the platform to more accurately determine the location of the base of the individual plants, a feature that is important for positioning mechanical weeding tools without causing damage to the crop plants. In particular, traversing a field generally traverse to the planted crop rows enables a partially- or fully-unobscured view of the individual plants, as the crops when viewed in this direction are spaced one row gap apart (often twenty to thirty inches apart), as opposed to being spaced in close proximity to one another (typically five to seven inches apart) when viewed along the length of the row. The larger gap between individual plants when traversing generally traverse to the rows also enables the platform to view the plants from a much shallower angle, thereby enabling more of a profile view, as opposed to a generally more restricted view from above when traversing parallel to the planted crop rows.

In addition to enabling better views of the individual plants, at any speed for which the platform is moving across a field, the larger gap between individual plants rows when traversing generally traverse to the rows enables a larger window of time to determine the location of the individual plants. Traversing generally traverse to the rows also enables a longer period of time to position the cultivation mechanism and to carry out the weed removal action. Moreover, mechanical weeding with embodiments of the present disclosure may provide significant energy savings over conventional mechanical weeding systems. In particular, cultivation generally traverse to a crop row through the disclosed embodiments requires a smaller amount of physical motion and energy when compared to the rapid movement required for mechanical weeding when moving parallel to the rows and targeting in-row weeds.

One embodiment of the present disclosure provides a multi-lobed wheel adapted to be mounted to an agricultural platform for traversal of an agricultural field generally traverse to adjacent rows of planted crops without crushing the individual plants. The multi-lobed wheel can include a wheel hub and a plurality of spaced apart lobes. The wheel hub can have a central axis on which the multi-lobed wheel is configured to rotate. The plurality of spaced apart lobes can define an outer perimeter configured to make ground engaging contact with the agricultural field, the outer perimeter including structure presenting a plurality of gaps between the plurality of spaced apart lobes, the gaps shaped and sized to provide sufficient clearance for individual plants within a planted crop row so as to enable the multi-lobed wheel to pass over a planted crop row without crushing the individual plants therein.

Another embodiment the present disclosure provides an agricultural platform configured to traverse an agricultural field generally traverse to adjacent rows of planted annual crops without crushing the individual plants. The agricultural platform can include a vehicle base and a plurality of multi-lobed wheels. Each of the multi-lobed wheels can include a wheel hub and a plurality of spaced apart lobes. The wheel hub can have a central axis on which the multi-lobed wheel is configured to rotate. The plurality of spaced apart lobes can define an outer perimeter configured to make ground engaging contact with the agricultural field, the outer perimeter including structure presenting a plurality of gaps between the plurality of spaced apart lobes, the gaps shaped and sized to provide sufficient clearance for individual plants within a planted crop row so as to enable the multi-lobed wheel to pass over a planted crop row without crushing the individual plants therein.

Another embodiment of the present disclosure provides a multi-lobed wheel adapted to be mounted to an agricultural platform for traversal of an agricultural field generally traverse to adjacent rows of planted crops without crushing the individual plants. The multi-lobed wheel can include a wheel frame and a track. The wheel frame can include a central axis on which the multi-lobed wheel is configured to rotate, and a plurality of shafts extending substantially parallel to the central axis. The track can be held in position by the plurality of shafts to form plurality of spaced apart lobes defining an outer perimeter configured to make ground engaging contact with the agricultural field. The outer perimeter can include structure presenting a plurality of gaps between the plurality of spaced apart lobes. The gaps shaped and sized to provide sufficient clearance for individual plants within a planted crop row so as to enable the multi-lobed wheel to pass over a planted crop row without crushing the individual plants therein. Another embodiment of the present disclosure provides an agricultural platform configured to traverse an agricultural field generally traverse to adjacent rows of planted annual crops without crushing the individual plants. Agricultural platform can include a vehicle base, a plurality of ground engaging wheels, and an actuator assembly. The plurality of ground engaging wheels can be configured to rotate about a central axis. The actuator assembly can be configured to shift the plurality of ground engaging wheels along the central axis and laterally with respect to the agricultural platform for the purpose of avoiding individual plants as the agricultural platform traverses the agricultural field.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which:

FIG. 1 is a perspective, schematic view depicting an agricultural platform having a plurality of multi-lobed wheels in accordance with an embodiment of the disclosure.

FIG. 2A is a profile view depicting a multi-lobed wheel in accordance with an embodiment of the disclosure FIG. 2B is a profile view depicting two multi-lobed wheels contacting the ground at different rotation angles in accordance with an embodiment of the disclosure.

FIG. 2C is a four-lobed wheel configured to traverse one row of planted crops per each revolution.

FIG. 2D is a four-lobed wheel configured to traverse four rows of planted crops for every three revolutions.

FIG. 2E is a four-lobed wheel configured to traverse two rows of planted crops per each revolution.

FIG. 2F is a four-lobed wheel configured to traverse four rows of planted crops per each revolution.

FIG. 3 is a profile view depicting a two axle lobed wheel configuration contacting the and at different rotation angles in accordance with an embodiment of the disclosure.

FIG. 4 is a perspective view depicting the width of two lobed wheels in accordance with an embodiment of the disclosure.

FIGS. 5A-C depict a multi-lobed wheel having a plurality of contact surfaces in accordance with an embodiment of the disclosure.

FIGS. 6A-B are perspective views depicting a platform having a first lobed wheel positioned substantially orthogonal relative to a second lobed wheel in accordance with an embodiment of the disclosure.

FIG. 7 is a plan view depicting the repositioning of a platform on an agricultural field in accordance with an embodiment of the disclosure.

FIG. 8 is a perspective view of a multi-section wheel in accordance with an embodiment of the disclosure.

FIG. 9A is a plan view depicting multi-section wheel of FIG. 8, wherein a center wheel is shifted to the right.

FIG. 9B is a plan view depicting multi-section wheel of FIG. 9A, wherein the center wheel is shifted to the left.

FIG. 10 is a perspective view depicting a platform with an articulating base having a plurality of multi-section wheels in accordance with an embodiment of the disclosure.

FIG. 11A depicts an individual planted crop as viewed from above by a forward-facing sensor on an agricultural platform traversing substantially parallel to a planted row in accordance with an embodiment of the disclosure.

FIG. 11B depicts an individual planted crop when viewed from the side by a forward-facing sensor on a platform traversing generally traverse to a planted row in accordance with an embodiment of the disclosure.

FIG. 12 is a plan view depicting spaces between individual plants of an agricultural field in accordance with an embodiment of the disclosure.

FIG. 13 is a perspective view depicting a platform having a cultivation mechanism in accordance with an embodiment of the disclosure.

While embodiments of the disclosure are amenable to various modifications and alternative forms, specifics thereof are shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure as defined by the appended claims.

DETAILED DESCRIPTION

Referring to FIG. 1, an agricultural platform 100 having a plurality of lobed wheels configured to traverse an agricultural field 101 perpendicularly to rows of planted crops 102 without damaging the individual plants 103 is depicted in accordance with an embodiment of the disclosure. Agricultural platform 100 generally includes a vehicle base 104 supported by a plurality of multi-lobed wheels 106. In one embodiment, vehicle base 104 can include a plurality of articulating sections hingedly connected to one another, similar to the vehicle disclosed in U.S. Patent Publ. No.

2015/0051779, as previously incorporated by reference herein. In other embodiments, the vehicle base 104 can be a unitary rigid member.

Referring to FIG. 2A-B, a multi-lobed wheel 106 adapted to be mounted to an agricultural platform for traversal of an agricultural field 101 generally traverse to adjacent rows of planted crops 102 without crushing the individual plants 103 is depicted in accordance with an embodiment of the disclosure. In one embodiment, multi-lobed wheel 106 can include a wheel hub 111 having a central axis 105 on which the multi-lobed wheel 106 is configured to rotate.

Lobed wheel 106 can further include a plurality of spaced apart lobes 107 structured to enable only a portion of the outer perimeter 108 to contact the ground. In one embodiment, multi-lobed wheel 106 has three or more lobes 107 that contact the ground. In other embodiments, the geometry of the multi-lobed wheel 106 design can be adjusted to match different crop row 102 spacing. The outer perimeter 108 can include structure presenting a plurality of gaps 109 between the plurality of spaced apart lobes 107. The gaps 109 can be shaped and sized provide sufficient clearance for individual plants 103 within a planted crop row 102, so as to enable the multi-lobed wheel 106 to pass over a planted crop row 102 without crushing the individual plants 103 therein. In one embodiment, to maximize surface contact and traction and minimize vibration, as well as disruption to the soil surface, the leading and trailing edges of lobes 107 can be rounded or beveled.

In one embodiment, each of the plurality of spaced apart lobes 107 can extend from wheel hub 111 across angle $\theta_1$; accordingly, each gap 109 can be defined across angle $\theta_2$. In one embodiment, $\theta_1$ is substantially equal to 60-degrees, while $\theta_2$ is substantially equal to 30-degrees. Other angular configurations are also contemplated. Referring to FIG. 2B, in one embodiment, the gap 109 can have a width $D_1$ and a height $D_2$ shaped and sized provide sufficient clearance for individual plants 103 within a planted crop row 102. In one embodiment, $D_1$ can be between two and twelve inches, and $D_2$ can be between two and twelve inches. Other dimensions of gap 109 are also contemplated.

As the wheels 106 roll forward or backward, the gaps 109 on the perimeter 108 of the wheel 106 between lobes 107 line up with the rows of planted crops 102. In this manner, the wheels 106 effectively drive over rows 102. Accordingly, wheels 106 enable an agricultural vehicle (e.g., tractor, robotic machine) to travel across a field 101 generally orthogonal to planted rows 102, without crushing the individual crop plants 103. In some embodiments, the agricultural platform 100 further includes an adjustment module (not depicted) configured to detect crop rows and make adjustments to the wheel geometry and/or the rotational motion of individual wheels 106 to adapt on-the-fly to inconsistencies in the layout of rows 102 or drift of the agricultural platform's 100 position relative to the crop rows 102.

Referring to FIGS. 2C-F, a four-lobed wheel 106 having a given radius can well be suited to traverse agricultural fields 101 having conventional crop row spacing. Conventional crop row spacing can be, for example rows of planted crops 102 spaced twenty inches apart, thirty inches apart, or thirty-six inches apart. In one embodiment, the circumference of the outer perimeter 108 can be sized to enable the multi-lobed wheel 106 to pass over one row of planted crops 102 for each revolution (as depicted in FIG. 2C). In one embodiment, the circumference of the outer perimeter 108 can be sized to enable the multi-lobed wheel 106 to pass over four rows of planted crops 102 for every three revolutions (as depicted in FIG. 2D). In one embodiment, the circumference of the outer perimeter 108 can be sized to enable the multi-lobed wheel 106 to pass over two rows of planted crops 102 for each revolution (as depicted in FIG. 2E). In one embodiment, the circumference of the outer perimeter 108 can be sized to enable the multi-lobed wheel 106 to pass over four rows of planted crops 102 for each revolution (as depicted in FIG. 2F). For example, in one embodiment the circumference of the outer perimeter 108 is sized such that for each revolution of the multi-lobed wheel 106 each of the gaps 109 between the plurality of spaced apart lobes 107 line up with a row of planted crops 102. To accommodate these embodiments, the radius of a given four-lobed wheel 106 can be adjusted in size to approximate the radii listed in Table 1.

TABLE 1

|  | 20 inch crop row spacing | 30 inch crop row spacing | 36 inch crop row spacing |
| --- | --- | --- | --- |
| 1 row per revolution | 3.2 inches | 4.8 inches | 5.7 inches |
| 2 rows per revolution | 6.4 inches | 9.5 inches | 11.5 inches |
| 4 rows per revolution | 12.7 inches | 19.1 inches | 22.9 inches |

In other embodiments, the number of lobes 107 can be increased or decreased to accommodate different crop row spacing.

By virtue of the lobed wheel design 106, agricultural platform 100 moves up and down a distance 110 (as depicted in FIG. 2B) as the wheels rotate between a single lobe 107a contacting the ground 101 and two lobes 107a, 107b partially contacting the ground 101. To minimize this vertical movement, agricultural platform 100 can include an auto-leveling mechanism (not depicted) configured to maintain the vehicle base 104 (or other components) at a substantially constant height above the ground surface 101.

Referring to FIG. 3, in another embodiment, to minimize vertical movement, a plurality of lobed wheels 106 are offset by an angle $\theta_3$. For example, a continuous rotational phase shift can exist between a first multi-lobed wheel 106a and a second multi-lobed wheel 106b. For example, in one embodiment, angle $\theta$ is substantially equal to forty-five degrees. Additionally, the respective central axes 105a/b of the first and second multi-lobed wheel 106a/b can be spaced apart a distance of $D_3$. For example, in one embodiment, $D_3$ is approximately one-eighth of the circumference of the outer perimeter 108. Other angles and distances are also contemplated.

In this configuration, as wheel 106a approaches the crop row 102 and transitions off the ground, wheel 106b—which is spaced on the agricultural platform 100 forward or aft of wheel 106a—transitions to being fully engaged with the soil surface 101. As wheel 106a is lifted off the ground and the gap is centered over the crop row 102 while wheel 106b is engaged with the soil surface 101. Accordingly, pairing wheels 106a, 106b in this configuration reduces or eliminates the inherent vertical motion caused by the use of a single lobed wheel.

Referring to FIG. 4, the width of lobed wheels 106 can vary. In conventional systems that traverse a field parallel to crop rows 102, the tire width is constrained by the spacing between crop rows 102. Specifically, sufficient clearance is required so that the wheels 106 do not rub against and/or drive over the individual plants 103 as the vehicle is driven along the rows 102. Although the use of GPS-guidance enables growers to use somewhat wider tires, there is still an absolute constraint imposed by the row 102 spacing.

The width of the tires or wheels 106 greatly influences soil compaction and the creation of ruts on fields, which generally are viewed negatively by farmers. Soil compaction is a function of ground pressure and gross vehicle weight. A wider wheel 106 exerts lower ground pressure. In systems that traverse a field generally traverse to row 102, such as the agricultural platform 100, the width W of the wheels 106 are not constrained by the spacing between rows 106. Accordingly, the width W' of the wheels of agricultural platform 100 can be widened as necessary to increase flotation and reduce ground pressure. This can be particularly beneficial when the soil 101 is loose, moist or wet.

Referring to FIG. 5A-C, a multi-lobed wheel 106 according to an embodiment of the disclosure is depicted. In one embodiment, multi-lobed wheel 106 comprises a non-conventional tire 112 that includes a rubber track 114—similar to that used on tracked vehicles—that contacts a plurality of contact surfaces for engaging with the ground surface 101. In one embodiment, track 114 is held in position by shafts 116, 120 that are attached to outer and inner wheel frames 118a, 118b positioned on either side of the track 114. In one embodiment, the inner shafts 120 are radially adjustable relative to a central axis 122, thereby enabling the adjustment of the track 114 tension. In one embodiment, the locations of the outer shafts 116 are adjustable to vary the geometry of the wheel 106 to account for different crop row 102 spacing.

In one embodiment, one or more of the shafts 116, 120 are motorized to enable the track 112 to rotate around the perimeter 108 of the wheel 106, similar to a belt on two or more pulleys. In one embodiment, the motorized track 112 enables course adjustments, for example, by reversing the track 112 to slow the forward progress of the vehicle on one side while the wheels 106 are rotating on their central axes 122.

In another embodiment, where track 112 is free to rotate around the perimeter 108 of the wheel 106, one or more of the shafts 116, 120 acts as a brake for the purpose of enabling slight course corrections. For example, if the wheel lobes 107 are slightly out-of-sync with the gaps between rows, selective braking of the track 112 can enable the individual wheels 106 to adjust their position relative to the gaps between rows 102. In one embodiment, the braking action enables adjustment of the lobes 107 relative to the gap between rows 102 where the agricultural platform 100 gets out-of-sync with the gaps. This is useful to account for the occasional variable spacing that commonly exists between rows 102.

In another embodiment, the angle between the lobes is adjusted using an actuator (not depicted). In this embodiment, if the platform's adjustment module detects that the row spacing ahead is not ideal, or that the platform is otherwise becoming out-of-sync with the row gap, the angle between two of the lobes 107 can be adjusted while the lobes 107 to be adjusted are off the ground. After traversing the out-of-sync row gap, the adjustment is reversed and the lobes 107 are returned to their original position.

In one embodiment, the lobed wheel 106 employs a control system (not depicted) that uses one or more sensor inputs to locate the position of crop rows 102 relative to the moving agricultural platform 100. Such a system signals a stop to enable repositioning, or it initiates on-the-fly adjustment of position relative to crop rows, for example by skidding the wheels 106 side-to-side in order to make a slight adjustment to position.

Referring to FIGS. 6A-B, in one embodiment, the lobed wheels 106 can turn relative to the vehicle base 104. During normal field operations, an agricultural platform 100 commonly executes turns, often in connection with reversing course and traveling at 180 degrees from the previous course. In general, there is concern about damaging the crops 103 during such turns. To reduce the potential damage caused during turning, in one embodiment, the lobed wheels 106 rotate 90 degrees about a vertical axis 124 such that the agricultural platform 100 can move to the side, parallel to the crop row 102 some distance (for example the operational width of the agricultural platform 100) to re-position itself at the start of a new intended path. An example of such repositioning is depicted in FIG. 7.

In one embodiment, where the wheels are configured in an arrangement such as that described in connection with FIGS. 3A-B, agricultural platform 100 can be supported by one of the two wheels 106a, while the other wheel 106b—which is not touching the ground 110—is rotated 90 degrees about a vertical axis 124. The agricultural platform 100 can then move forward or backwards slightly via wheel 106a until it disengages from the ground, while wheel 106b is rotated to engage the ground. In one embodiment, wheel 106b is rotated so that it contacts the ground 101 between planted rows 102, so as to not damage the individual plants 103. Wheel 106b can be used to traverse the field 101 in a generally traverse direction to the original direction. The process can be reversed when the agricultural platform 100 has been repositioned.

In another embodiment, an auxiliary set of wheels (not shown) are used for repositioning. For example, in one embodiment agricultural platform 100 has a plurality of wheels that are oriented generally traverse to the main lobed wheels 106. In their normal position they are raised off of the ground, but during repositioning they are lowered sufficiently to raise the main lobed wheels 106 off of the ground 101. The auxiliary wheels are then used to reposition the platform 100. After repositioning the process is reversed and the auxiliary wheels are raised back into their "travel" position.

Referring to FIG. 8, in one embodiment, agricultural platform 100 can include a multi-section wheel 126. Conventional tires are generally too wide to fit in the gap between plants 103 in a row, as it is common that plant spacing is seven inches or less along the row 102. To enable the wheels to pass between individual plants 103 while at the same time dispersing the weight of the platform over a larger surface area to lower ground pressure, in one embodiment, the wheel 126 is made up of several moveable sections 128. As depicted, wheel 126 can have multiple, relatively thin wheels sections 128 mounted on an axle 130.

In one embodiment, the multi-section wheel 126 further includes a plurality of computer controlled actuators 132 configured to control the side-to-side positioning of the wheel sections 128 on the axle 130, for the purpose of avoiding individual plants 103. The computer control in one embodiment is in communication with or communicated from the adjustment module (not shown), and can use feedback from a computer vision system that identifies the layout of individual crop plants 103. A computer controller (not shown) can receive the sensor data, such as information provided from a visual system 134 (depicted in FIG. 10), such as a stereo camera or laser scanner (LIDAR), to localize the position of individual plants 103 relative to the platform 100.

With a multi-section wheel 126 configuration, as the agricultural platform 100 traverses across the field 101, the moveable sections 128 are occasionally repositioned laterally from side-to-side via one or more actuators 132. Referring to FIG. 9A, actuator 132a is depicted in the open position, while actuator 132b is depicted in the closed position. In FIG. 9B, the positions of actuators 132b and 132a is reversed. The effect is to control the positioning of moveable section 128a relative to the rest of the multi-section wheel 126.

Referring to FIG. 10, in one embodiment, a plurality of multi-section wheel assemblies 126 are used with an articulating vehicle base 104. For example, in one embodiment, agricultural platform 100 is comprised of two segments 104a, 104b that articulate relative to one another, thereby enabling turning of the agricultural platform 100. In other words, in this embodiment, in order to effect a turn, it is not necessary for the wheel assemblies 126 to turn relative to vehicle base 104.

In one embodiment, while traversing generally traverse to planted crop rows the platform 100 identifies and determines the location of individual plants 103 relative to the agricultural platform 100, and mechanically removes any weeds in the gap between the identified crop plants 103. Traveling generally traverse to the planted crop rows 102 enables the agricultural platform 100 to more accurately determine the location of the base of the individual plants 103. In particular, traversing a field 101 generally traverse to the planted crop rows 102 enables a more unobscured view of the individual plants 103, as the individual plants 103 when viewed in this direction are spaced one row gap apart (often twenty to thirty inches apart), as opposed to being spaced in close proximity to one another (typically five to seven inches apart) when viewed along the length of the row 103. The larger gap between individual plants 103 when traversing generally traverse to the rows 103 also enables the platform to view the plants from a much shallower angle, thereby enabling more of a profile view, as opposed to a generally more restricted view from above when traversing parallel to the planted crop rows 103. For example, compare a young corn plant 103 when viewed from above by a sensor on a system traveling parallel to the planted crop rows 102 (as depicted in FIG. 11A), with a young corn plant 103 when viewed from the side by a sensor on a platform 100 traversing generally traverse to the planted crop rows 102 (as depicted in FIG. 11B).

In addition to enabling better views of the individual plants 103, at any speed for which the platform 100 is moving across field 101, the larger gap between individual crop rows 103 when traversing generally traverse to the rows 103 enables a larger window of time to determine the location of the individual plants 102 and weeds 140. For example, if the platform 100 is traveling at a constant speed of four miles per hour, between four and six individual crops 103 would be encountered running parallel to the rows 103, as opposed to only one row of crops 103 when traveling generally traverse to the rows 103. Referring to FIG. 12, a view of a field 101 showing the time-distance between plants (100 ms at a speed of 4 mph) for parallel travel, compared to the time-distance between rows (850 ms at a speed of 4 mph) for generally traverse travel as depicted.

Referring to FIG. 13, a mechanical weeding platform 100' according to an embodiment of the disclosure is depicted. In one embodiment, the platform 100' includes a computer system (not shown) that interprets the signal from one or more visual systems 134 configured to sense the arrangement and location of crop plants 103 on the field 101. In one embodiment, platform 100' includes a cultivation mechanism 142 that comprises a plurality of cultivation tools or wheels 144 configured to be shifted from side-to-side by actuators 146, similar to the actuation of the moveable wheel sections 128, as described above. In one embodiment, tines or other devices (not depicted) are used to enhance weed removal.

In some embodiments, the mechanical weeding platform 100' is configured to traverse the field 101 in a pattern generally traverse to the planted crop rows 103, followed by a pattern substantially parallel to the crop rows 103, or vice versa. Thus, platform 101' can be used in multiple directions on a given field 101, while removing many of the weeds 140 that would otherwise negatively impact crop yield.

Where mechanical weeding systems are employed, traversing a field 101 generally traverse to the rows 102 enables a longer period of time to position the cultivation (weeding) mechanism 142. Moreover, mechanical weeding with embodiments of the present disclosure also provides a significant energy savings over conventional mechanical weeding systems. In particular, the shifting of cultivation tools 144 from side-to side requires a relatively small amount of physical motion and energy when compared to the rapid movement required for mechanical weeding in the five to seven inch gaps between individual crops 103 when moving parallel to the rows.

Persons of ordinary skill in the relevant arts will recognize that embodiments may comprise fewer features than illustrated in any individual embodiment described above. The embodiments described herein are not meant to be an exhaustive presentation of the ways in which the various features may be combined. Accordingly, the embodiments are not mutually exclusive combinations of features; rather, embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of Section 112, sixth paragraph of 35 U.S.C. are not to be invoked unless the specific terms "means for" or "step for" are recited in a claim.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

What is claimed is:

1. An agricultural platform having a plurality of multi-lobed wheels configured to traverse an agricultural field generally traverse to adjacent rows of planted crops while providing clearance for individual plants within each row of planted crops, the agricultural platform comprising:
   a vehicle base;
   a plurality of multi-lobed wheels, each multi-lobed wheel including
      a wheel hub including a central axis on which the multi-lobed wheel is configured to rotate; and
      a plurality of spaced apart lobes defining an outer perimeter configured to make ground engaging contact with the agricultural field, the outer perimeter including structure presenting a plurality of gaps between the plurality of spaced apart lobes, the gaps shaped and sized to provide clearance for individual plants within a row of planted crops, wherein a circumference of the outer perimeter is sized such that for each revolution of the multi-lobed wheel, at least one of the plurality of gaps lines up with a corresponding row of planted crops, so as to enable the multi-lobed wheel to pass over the corresponding row of planted crops without compressing the individual plants therein into the agricultural field; and
   a control system having one or more sensors configured to localize a row of planted crops relative to the vehicle base, and enable corrective action to align a gap between the plurality of spaced apart lobes of at least one multi-lobed wheel with the localized row of planted crops during operation to adapt for inconsistencies in a layout of adjacent rows in the agricultural field.

2. The agricultural platform of claim 1, wherein each multi-lobed wheel includes three or more spaced apart lobes.

3. The agricultural platform of claim 1, wherein the circumference of the outer perimeter of each multi-lobed wheel is sized to provide clearance for individual plants in an agricultural field having rows of planted crops spaced between twenty and thirty-six inch apart.

4. The agricultural platform of claim 1, wherein the circumference of the outer perimeter of each multi-lobed wheel is sized such that for each revolution, the gaps between the plurality of spaced apart lobes line up with a row of planted crops.

5. The agricultural platform of claim 1, wherein the outer perimeter of each multi-lobed wheel has a width of between four and thirty-six inches.

6. An agricultural platform configured to traverse an agricultural field generally traverse to adjacent rows of planted annual crops while providing clearance for individual plants within each row of planted crops, the agricultural platform comprising:
   a vehicle base; and
   at least one pair of offset multi-lobed wheels, including a forward multi-lobed wheel and an aft multi-lobed wheel, wherein each of the forward and aft multi-lobed wheels includes
      a wheel hub including a central axis on which the multi-lobed wheel is configured to rotate; and
      a plurality of spaced apart lobes defining an outer perimeter configured to make ground engaging contact with the agricultural field, the outer perimeter including structure presenting a plurality of gaps between the plurality of spaced apart lobes, the gaps shaped and sized to provide clearance for individual plants within a row of planted crops, so as to enable each multi-lobed wheel to pass over the row of planted crops without compressing the individual plants therein into the agricultural field;
   wherein the forward multi-lobed wheel is rotated relative to the aft multi-lobed wheel to maintain a continuous rotational phase shift between the forward and aft multi-lobed wheels, thereby reducing vertical motion of the agricultural platform; and
   a control system having one or more sensors configured to localize a row of planted crops relative to the vehicle base, and enable corrective action to align a gap between the plurality of spaced apart lobes of at least one multi-lobed wheel with the localized row of planted crops during operation to adapt for inconsistencies in a layout of adjacent rows in the agricultural field.

7. The agricultural platform of claim 6, further comprising at least one cultivation tool configured to disrupt the root systems of weeds within the agricultural field.

8. The agricultural platform of claim 7, further comprising at least one actuator configured to individually shift the at least one cultivation tool laterally with respect to the agricultural platform.

9. The agricultural platform of claim 6, wherein the continuous rotational phase shift includes a phase shift of approximately forty-five degrees between the forward and aft multi-lobed wheels.

10. The agricultural platform of claim 9, wherein the at least one multi-lobed wheel lifted off the ground is pivotable relative to the non-lifted multi-lobed wheels about a pivot substantially orthogonal to the central axis for the purpose of affecting lateral movement of the agricultural platform.

* * * * *

UNITED STATES PATENT AND TRADEMARK OFFICE
CERTIFICATE OF CORRECTION

PATENT NO. : 10,377,170 B2
APPLICATION NO. : 15/180685
DATED : August 13, 2019
INVENTOR(S) : Kent Cavender-Bares et al.

It is certified that error appears in the above-identified patent and that said Letters Patent is hereby corrected as shown below:

In the Claims

Claim 3, Column 13, Line 40:
Delete "inch" and insert --inches--.

Signed and Sealed this
Eighth Day of October, 2019

Andrei Iancu
*Director of the United States Patent and Trademark Office*